United States Patent [19]

Tokushima et al.

[11] Patent Number: 5,690,580

[45] Date of Patent: Nov. 25, 1997

[54] NEUTRAL APPARATUS FOR ELECTRIC VEHICLE

[75] Inventors: Shoji Tokushima; Kiyoshi Kimura; Hisahiro Ito; Tomoyuki Itoh; Kiyotaka Hayashi; Naofumi Hoshi, all of Saitama-ken, Japan

[73] Assignee: Honda Giken Kogyo, Kabushiki Kaisha Tokyo, Japan

[21] Appl. No.: 634,855

[22] Filed: Apr. 19, 1996

[30] Foreign Application Priority Data

Apr. 19, 1995 [JP] Japan ..................... 7-093729

[51] Int. Cl.$^6$ ..................................... B60K 41/48
[52] U.S. Cl. ................. 477/8; 477/12; 477/15; 318/265; 180/65.7; 180/65.8
[58] Field of Search ................. 477/7, 8, 11, 12, 477/10, 13, 174, 179; 318/626, 265, 266, 286, 468; 320/2; 180/65.1, 65.6, 65.7, 65.8

[56] References Cited

U.S. PATENT DOCUMENTS

| | | | |
|---|---|---|---|
| 2,662,604 | 12/1953 | Henderson | 318/265 X |
| 2,936,052 | 5/1960 | Snarr | 477/13 X |
| 3,896,914 | 7/1975 | Konsbruck et al. | 477/15 |
| 3,984,742 | 10/1976 | Bader | 180/65.1 X |
| 4,520,909 | 6/1985 | Brewer | 477/13 X |

FOREIGN PATENT DOCUMENTS 6-225402  8/1994  Japan.

*Primary Examiner*—Khoi Q. Ta
*Attorney, Agent, or Firm*—Nikaido, Marmelstein, Murray & Oram LLP

[57] ABSTRACT

A neutral apparatus for use on an electric vehicle is disclosed. The neutral apparatus comprises a control state detector and a neutral mechanism control circuit. The control state detector detects whether or not the motor control unit is in a predetermined control state. The neutral mechanism control unit can instruct the neutral mechanism to interrupt the power train according to the output signal from the control state detector. If the motor control unit is not in the predetermined control state, this is detected by the control state detector. In response to the output signal from the control state detector, the neutral mechanism control circuit causes the neutral mechanism to interrupt the power train. Thus, power flow from the motor to the drive wheels is interrupted. The control state detector is comprised of a voltage comparator circuit for comparing the output voltage from the motor driver circuit with a reference voltage and produces an output signal. As a result, it becomes possible to monitor the control state of the vehicle during movement thereof by means of an arrangement simple in construction.

6 Claims, 4 Drawing Sheets

NEUTRAL APPARATUS FOR ELECTRIC VEHICLE

BACKGROUND OF THE INVENTION

1. Field of the Invention

The present invention relates generally to a neutral apparatus for use on an electric vehicle and, more particularly, to a neutral apparatus for use on an electric vehicle, which is simple in construction and capable of monitoring the control state of the vehicle during movement thereof.

2. Description of the Related Art

An electric vehicle is equipped with a vehicle-driving portion made up of an electric motor for receiving electric power from a battery and drive wheels coupled to the motor. The drive wheels are rotated by the motor. In this electric vehicle, when the battery has fully discharged, the vehicle is towed by another vehicle. In one known construction, the vehicle is equipped with a manual neutral apparatus for mechanically uncoupling the wheels from the motor in order to reduce the load imposed during movement of the vehicle.

In a known electric vehicle control apparatus as disclosed in Japanese Patent Laid-Open Publication No. HEI 6-225402, a permanent-magnet motor is subjected to a field weakening control at high rotational speeds. If the selector lever is in N, and if the motor speed is in excess of the speed at which the field weakening control is started, this control apparatus controls the motor output torque down to 0. Under this condition, the permanent-magnet motor does not function as a generator. Therefore, a counter electromotive force which would be produced when the motor acts as a generator is suppressed. Hence, electric current induced by the counter electromotive force is prevented from flowing into the battery.

The aforementioned field weakening control is provided in the manner described now. When the permanent-magnet motor is rotated at high speeds exceeding a given rotational speed, a primary current field-current component is passed through the motor in such a way that a magnetic field is produced in opposition to the magnetic field generated by the permanent magnets in the motor. Thus, the total magnetic field is weakened. As a result, the torque characteristics of the motor are extended to higher rotational speeds.

When the motor control circuit and the like are not in a predetermined control state while the vehicle is moving, the motor, in the absence of a control, is rotated by the wheels until the neutral apparatus is operated to disconnect the motor. The motor rotation causes the motor to act as a generator, thus producing a counter electromotive force. It follows that this counter electromotive force acts on the motor control circuit. Especially, in the case of a vehicle having a motor rotated at high speeds under a field weakening control, if the motor is rotated at high speeds, an undesirable high counter electromotive force is produced. To avoid such high counter electromotive force, it is necessary to set the withstand voltage of the motor control circuit at a high voltage value. In addition, a countermeasure to suppress the generation of regenerative braking force is needed. Consequently, the costs of the components typified by the motor control unit are inevitably increased. Further, the weights of the components are increased. Moreover, more space will be occupied by the components.

SUMMARY OF THE INVENTION

It is an object of the present invention to provide a neutral apparatus for use on an electric vehicle, which is simple in construction and capable of monitoring a control state of the vehicle during movement thereof.

According to the present invention, there is provided a neutral apparatus which includes a neutral mechanism within a power train for transmitting the rotational force of the motor to drive wheels and hence the vehicle, the neutral mechanism being capable of interrupting the power train. The neutral apparatus comprises a control state detector and a neutral mechanism control circuit. The control state detector determines whether the motor control unit for controlling the motor is in a predetermined control state. The neutral mechanism control circuit actuates an actuator in response to a signal output from the control state detector and causes the neutral mechanism to interrupt the power train. Accordingly, when the motor control unit is not in a predetermined control state, this is detected by the control state detector. In response to the signal output from the control state detector, the neutral mechanism control circuit makes the neutral mechanism interrupt the power train, whereby the power flow from the motor to the wheels is interrupted.

The control state detector is comprised of a voltage comparator circuit for comparing the voltage, which is output from a motor driver circuit for driving the motor which in turn drives the vehicle, with a given reference voltage and produces a signal according to the result of the comparison. If the motor control circuit is not in a predetermined control state, the voltage comparator circuit generates a signal corresponding to a counter electromotive force produced by rotation of the motor. In response to this signal, the neutral mechanism control circuit causes the neutral mechanism to interrupt the power train.

BRIEF DESCRIPTION OF THE DRAWINGS

A preferred embodiment of the present invention will hereinafter be described in detail with reference to the accompanying drawings, in which.

DETAILED DESCRIPTION OF THE PREFERRED EMBODIMENTS

Figure 1:
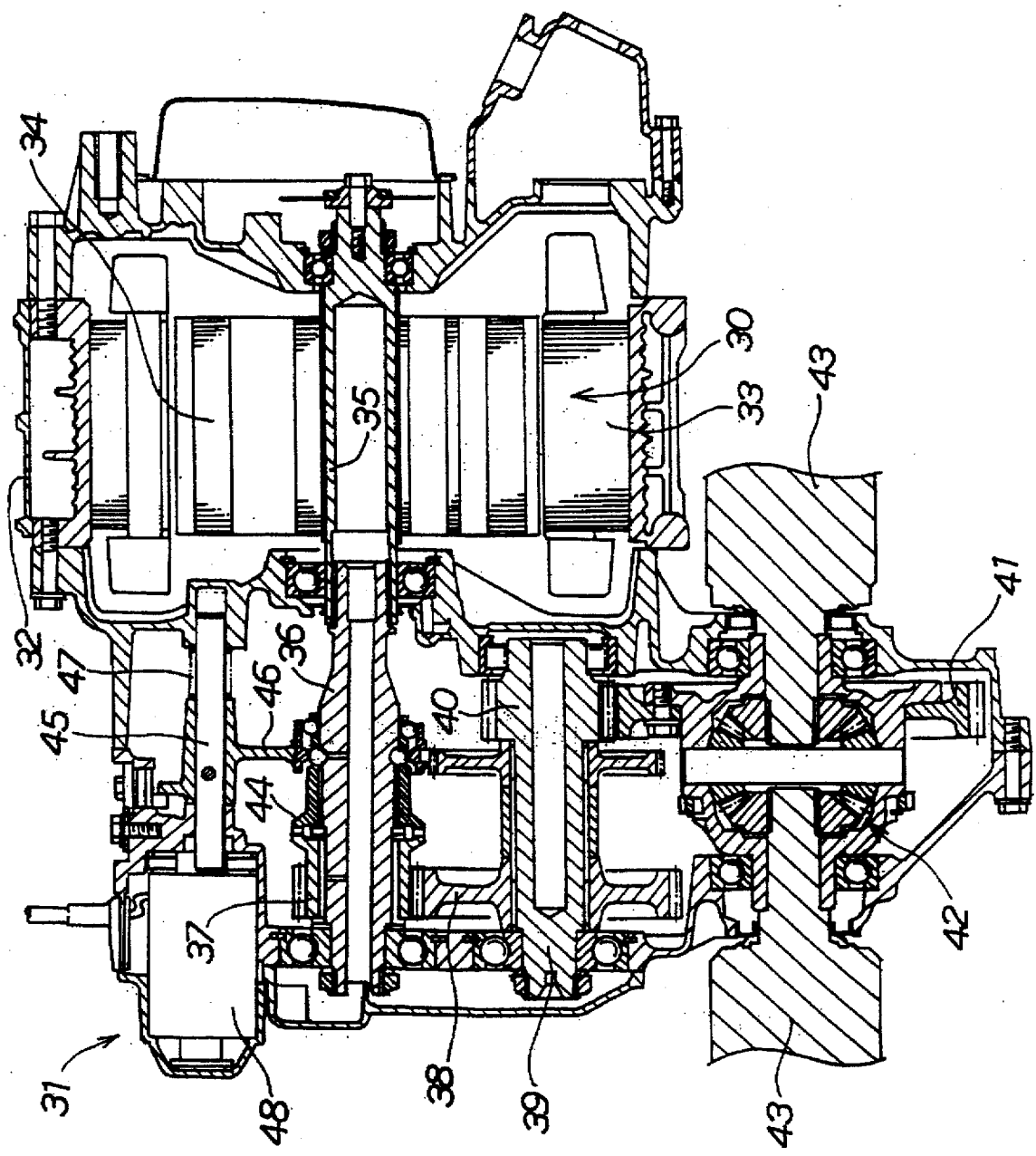
FIG. 1 is a cross-sectional view of a vehicle-driving portion including a neutral mechanism.

Referring to FIG. 1, there is shown the vehicle-driving portion of an electric vehicle having a neutral mechanism. This vehicle-driving portion includes an electric motor 30 acting as a prime mover and a power train 31 for transmitting rotating output from the motor 30 to two opposite drive wheels (not shown).

The motor 30 comprises a stator 33 located inside a motor casing 32 and a rotor 34 rotating inside the stator 33. The rotor 34 is equipped with a motor shaft 35 forming the output shaft of the motor 30.

The above-described power train 31 comprises an input shaft 36 coupled to the motor shaft 35, an input pinion 37 having a small diameter and rotatably held to the front end of the input shaft 36, a reduction gear 38 meshing with the input pinion 37 and having a diameter larger than that of the input pinion 37, a countershaft 39 mounted to one end of the reduction gear 38, an output pinion 40 having a small diameter and formed integrally with the other end of the countershaft 39, a final gear 41 meshing with the output pinion 40 and having a diameter larger than that of the output pinion 40, and two opposite output shafts 43 for transmitting the rotating force of the final gear 41 via a differential gear 42.

The rotational speed of the motor is lowered by the small input pinion 37 and by the large reduction gear 38. The lowered rotational speed is further lowered by the output pinion 40 of the countershaft 39 and by the large final gear 41. The drive wheels (not shown) are coupled to the two opposite output shafts 43, respectively.

A claw clutch 44 capable of sliding on the input shaft 36 is spline fit to the input shaft 36. The clutch 44 can be brought into and out of meshing engagement with the input pinion 37. As the claw clutch 44 moves forward or rearward, the rotating force of the input shaft 36 is coupled to, or uncoupled from, the input pinion 37. A shift fork 46 is fixedly mounted to the shift shaft 45 which is moved back and forth in the axial direction. As the shift fork 46 moves forward or rearward, the clutch 44 is made to slide.

The shift shaft 45 is always biased toward the front end (to the left as viewed in the figure) by the resilient force of a return spring 47. A solenoid 48 comprised of an actuator for sliding the shift shaft 45 toward the base (to the right) against the resilient force of the return spring 47 is mounted on the side of the front end of the shift shaft 45.

Figure 2:
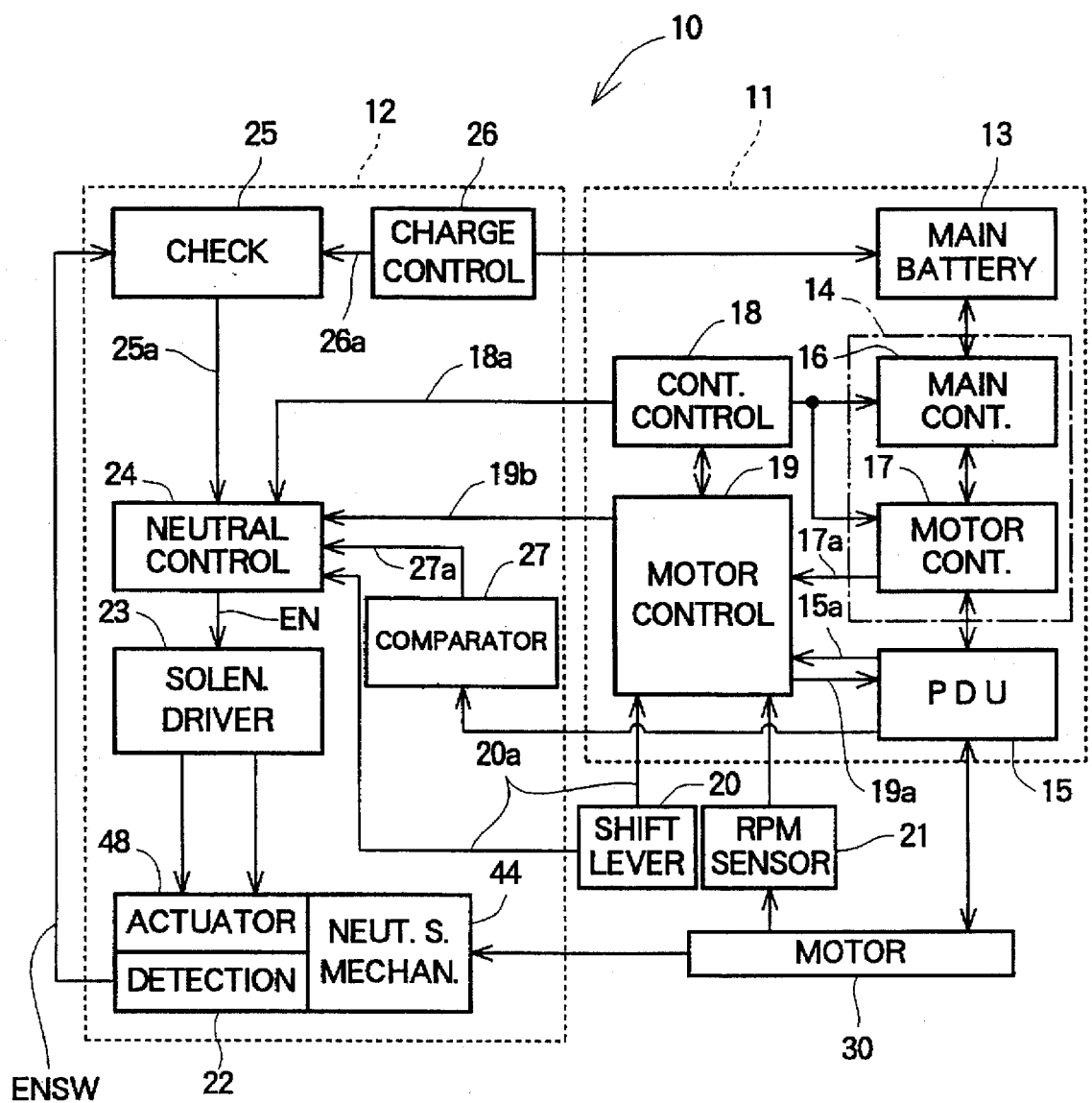
FIG. 2 is a functional block diagram of a vehicle-driving portion including a neutral apparatus according to the invention.

FIG. 2 is a functional block diagram of a vehicle-driving system equipped with a neutral apparatus according to the invention. The vehicle-driving system, generally indicated by reference numeral 10, comprises an electric motor 30, a motor control unit 11 for controlling operation of the motor 30, and the neutral apparatus, indicated by numeral 12. This neutral apparatus 12 controls the operation of the solenoid 48 to control the claw clutch 44 which is a neutral mechanism.

The aforementioned motor control unit 11 includes a battery 13 for supplying electric power to the motor. A rechargeable battery such as a lead-acid battery is used as the battery 13. The motor 30 receives electric power from the battery 13 via a power drive unit (PDU) 15 that is a motor driver circuit including contactors 14 and switching transistors. The contactors 14 include a main contactor 16 and a motor contactor 17. The main contactor 16 is a switch which, when opened, interrupts supply of electric power from the battery 13. The motor contactor 17 is a switch which, when closed, permits supply of electric power to the motor. The main contactor 16 and the motor contactor 17 can take the form of contacts such as relays, and are controlled by a contactor control circuit 18.

The motor control unit 11 further includes a motor control circuit 19 receiving a contact signal 17a indicating whether the motor contactor 17 is closed or open, a driving signal 15a indicating whether the power drive unit 15 is driving the motor 30, a position signal 20a indicating the position of the selector lever 20 operated by the driver, an accelerator pedal signal (not shown) indicating operation of the accelerator pedal, and a brake signal (not shown) indicating operation of the brake pedal. The motor control circuit 19 produces a motor control signal 19a to the power drive unit 15 according to these signals and the rotational speed of the motor 30 detected by a rotational speed (rpm) sensor 21 to control the output torque from the motor 30.

The neutral apparatus 12 is located between the motor 30 and the power train 31 (FIG. 1), the motor 30 producing driving force for the vehicle. The neutral apparatus 12 is connected with the motor control unit 11 for controlling the motor 30 so as to assume a state corresponding to the state of the motor controlled by the motor control unit 11.

The neutral mechanism 44 of the neutral apparatus 12 having of a claw clutch comprises the aforementioned actuator 48, for engaging or disengaging the claw clutch 44 (FIG. 1) of the power train and an operation detection circuit 22 for detecting the operation of the actuator 48. The actuator 48 is comprised of the solenoid (FIG. 1) having attracting and retaining coils. The solenoid 48 is actuated by a solenoid driver circuit 23, which is in turn controlled by a neutral mechanism control circuit 24. This control circuit 24 controls the neutral mechanism 44 having the claw clutch via the solenoid 48.

The operation detection circuit 22 detects the state of operation of the solenoid 48, as described above, and produces a signal (ENSW) indicating the detected state of operation to a function check-and-control circuit 25. This check-and-control circuit 25 checks the functions of the neutral apparatus 12, and is connected with a charge control circuit 26 and also with the neutral mechanism control circuit 24. The charge control circuit 26 controls charging of the main battery 13 in the motor control unit 11. The function check-and-control circuit 25 receives a charge control signal 26a from the charge control circuit 26 and sends a signal to the neutral mechanism control circuit 24 according to the charge control signal 26a. In particular, when the battery 13 is started to be charged from an external power supply under control of the charge control circuit 26, the function check-and-control circuit 25 sends a cutoff signal 25a to the neutral mechanism control circuit The neutral apparatus 12 further includes a voltage comparator circuit 27 acting as a control state detector. The voltage comparator circuit 27 has a reference voltage Vf. The comparator circuit 27 receives as an input terminal voltage V an output voltage from the power drive unit 15 of the motor control unit 11 and compares the voltage V with the reference voltage Vf. If the voltage V is in excess of the reference voltage Vf, then the voltage comparator circuit judges that the motor control unit 11 is not in a predetermined control state and sends out a signal 27a to the neutral mechanism control circuit 24.

When the selector lever 20 is shifted into another position, the position signal 20a is sent to the neutral mechanism control circuit 24.

The neutral mechanism control circuit 24 receives a control signal 19b produced from the motor control circuit under control of the power drive unit 15, a status signal 18a produced from the contactor control circuit 18 and indicating a state of being out of the predetermined control state, the signal 27a from the voltage comparator circuit 27, and the position signal 20a from the selector lever 20, and constantly monitors the control state of the motor control unit 11. For example, if the vehicle is not parked but is running, and if the neutral mechanism control circuit 24 receives the signal 27a from the voltage comparator circuit 27, then the neutral mechanism control circuit 24 sends an interruption operation command (EN) signal to the solenoid driver circuit 23 to disengage the neutral mechanism 44.

Figure 3:
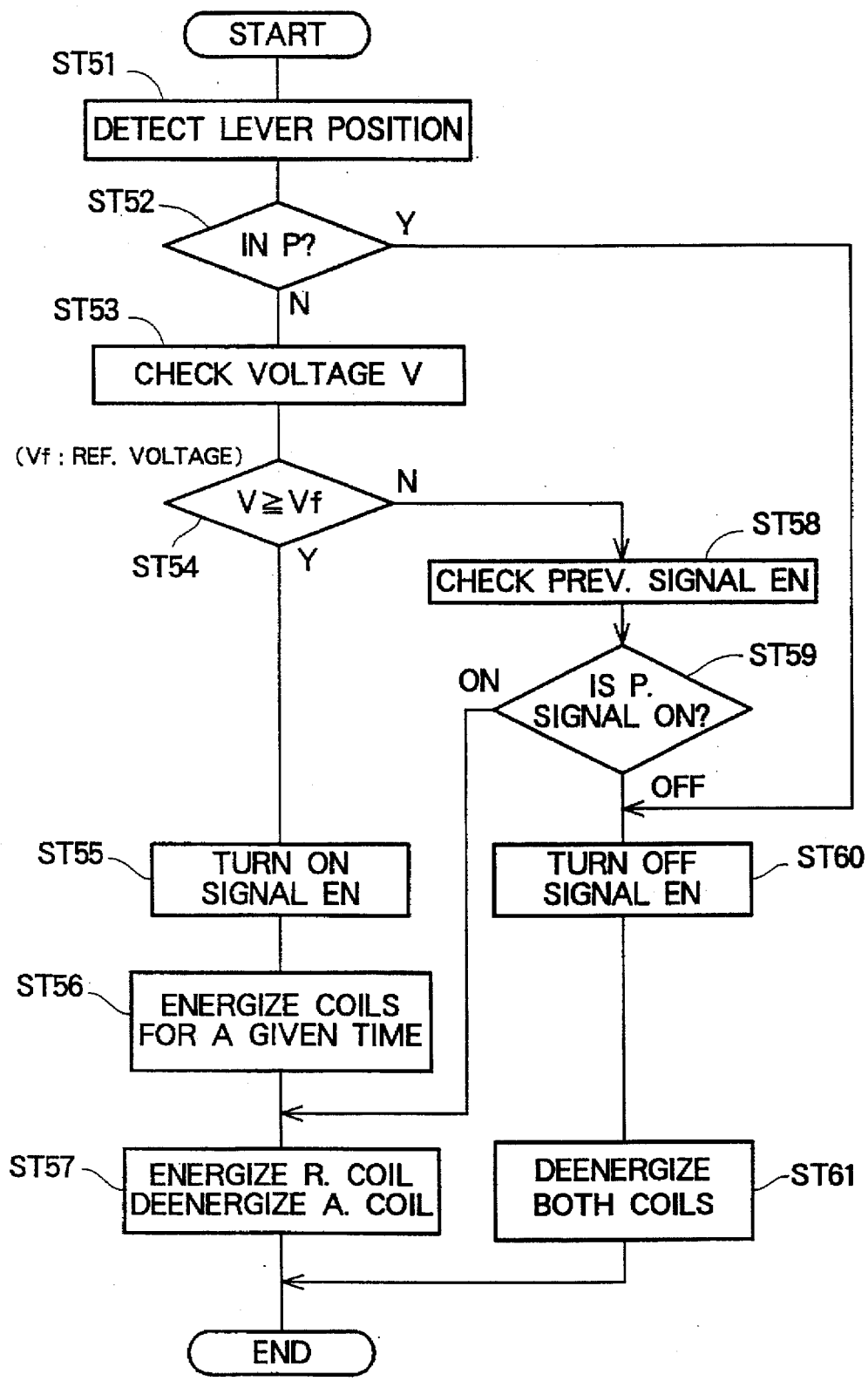
FIG. 3 is a flowchart illustrating a series of operations performed under a neutral mechanism control circuit included in the neutral apparatus shown in FIG. 2.
Figure 4:
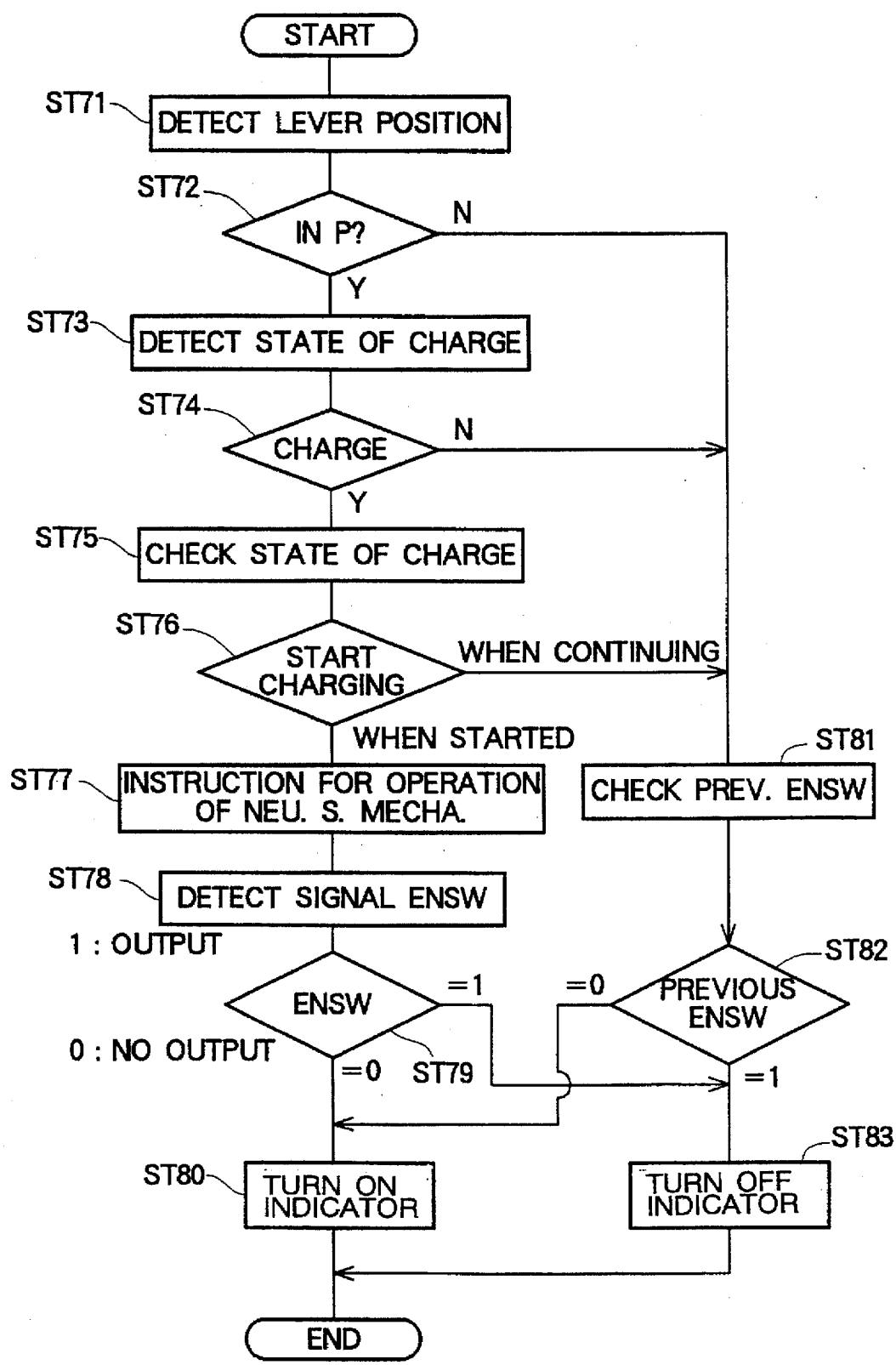
FIG. 4 is a flowchart illustrating a series of operations performed under control of a function check-and-control circuit included in the neutral apparatus shown in FIG. 2.

The operation of the neutral mechanism control circuit 24 is next described by referring to FIGS. 2–4. FIG. 3 is a flowchart illustrating a series of operations performed under control of the neutral mechanism control circuit 24. First, when the selector lever 20 is operated, the position signal 20a is produced. In response to this position signal 20a, the neutral mechanism control circuit 24 detects the position of the selector lever (step 51) and thus detects the operating condition of the vehicle. Judgment is made as to whether the detected position of the selector lever is P (parking) (step 52). That is, a judgment is made to determine whether the vehicle is parked or running (i.e., the selector lever is in one of N, D, and R). If the selector lever is not P, i.e., the vehicle is running, control goes to the next step 53, where the neutral mechanism control circuit 24 checks the input terminal voltage V output from the power drive unit 15 for purposes described below.

The input terminal voltage V output from the power drive unit 15 is compared with the reference voltage Vf (step 54). In the example of FIG. 2, the voltage comparator circuit 27 acting as a control state detector is shown to be separate from the neutral mechanism control circuit 24 (step 54). Of course, the judging function of the voltage comparator circuit 27 may be assigned to the neutral mechanism control circuit 24. In the example of FIG. 3 illustrating a flowchart, the neutral mechanism control circuit 24 is shown to include the control state detector. If the input terminal voltage V output from the power drive unit 15 is in excess of the reference voltage Vf, the motor control unit 11 is judged to be out of the predetermined control state. Then, the neutral mechanism control circuit 24 turns ON the interruption operation command (EN) signal for disengaging the neutral mechanism 44 comprised of a claw clutch (step 55).

The attracting coil and the retaining coil of the solenoid 48 formed of the actuator are energized for a given time to disengage the neutral mechanism 44 that is the claw clutch (step 56).

The retaining coil is kept energized, while the attracting coil is deenergized. Thus, the neutral mechanism 44 is subsequently kept disengaged (step 57).

If the judgment made in step 54 is that the input terminal voltage V output from the power drive unit 15 is less than the reference voltage Vf, then the previous interruption operation command (EN) signal is checked (step 58). If the judgment made at step 59 is that the previous interruption operation command (EN) signal is ON, i.e., if the motor control unit 11 is not in the predetermined control state, then control proceeds to step 57, where the retaining coil keeps the neutral mechanism 44 disengaged. If the previous interruption operation command (EN) signal is OFF, control goes to step 60, where the command (EN) signal is turned OFF.

Based on the OFF operation with respect to the command (EN) signal, the attracting and retaining coils of the solenoid 48 are deenergized (step 61) to bring the claw clutch 44 of the neutral mechanism back into an engaged state.

If the judgment made at step 52 is that the selector lever is in P (parking), then control proceeds to step 60, where the neutral mechanism 44 is engaged again.

FIG. 4 is a flowchart illustrating a series of operations performed under control of the function check-and-control circuit 25. This flowchart illustrates operations performed to check the operation of the claw clutch 44 that is the neutral mechanism without using the battery 13 installed on the vehicle during charge. The charge control circuit 26 shown in FIG. 2 may be included in the function check-and-control circuit 25. In the flowchart of FIG. 4, the function check-and-control circuit 25 includes the charge control circuit 26.

In FIG. 4, the function check-and-control circuit 25 detects the position of the selector lever of the vehicle (step 71). Judgment is made to determine whether the vehicle is parked, i.e., the selector lever is in P (step 72).

If the lever is in P, judgment is made to determine whether charging is to be done (steps 73 and 74). If so, judgment is made to determine whether charging has started (steps 75 and 76). When start of charging is detected, control goes to step 77.

In step 77, the cutoff signal 25a is sent to the neutral mechanism control circuit 24 to cause it to operate the neutral mechanism 44. In step 78, the function check-and-control circuit 25 receives the signal (ENSW) indicative of the operational state detected by the operation detection circuit 22 of the neutral mechanism 44. Judgment is made as to whether the signal (ENSW) is a predetermined one or not (step 79). If the operational state signal (ENSW) is not the predetermined one, i.e., the signal (ENSW) is not produced (ENSW=0), a command is output to make an indicator (not shown) indicate such zero output (step 80). The indicator may be a loudspeaker capable of producing sound or speech. Alternatively, it may be a light which is put on and off.

If the judgment made at step 76 is that charging to the battery 13 is continuing, then the previous (ENSW) signal is checked (steps 81 and 82). If the previous (ENSW) signal is 1, i.e., the neutral mechanism is in the predetermined control state, then the indicator is turned off (step 83). If the previous (ENSW) signal is 0, then the control proceeds to step 80, where the indicator is turned on.

If the judgment made at step 79 is that the output from the operation detection circuit 22 is 1, the neutral mechanism is in the predetermined control state. Control proceeds to step 83.

As described thus far, a neutral apparatus according to the invention is comprised of a control state detector for detecting whether the motor control unit is in the predetermined control state and a neutral control circuit for causing the neutral mechanism to disengage the power train in response to the signal output from the control state detector. If the motor control unit is not in the predetermined control state, such state is detected by the control state detector. In response to the output signal from the control state detector, the neutral control circuit causes the neutral mechanism to disengage the power train, whereby the drive wheels are uncoupled from the motor. As a result, since no rotational force acts upon the motor when the wheels are turned, it becomes possible to avoid an undesirable counter electromotive force to be generated by rotation of the wheels even if the motor control unit is not in the predetermined control state during movement of the vehicle. Hence, it is not necessary to set the rated withstand voltages of electronic components of the motor control unit at high values. This makes it possible to reduce the costs and weights of the components of the motor control unit in a vehicle adapted to run at a high rotational speed by the field-weakening control.

Furthermore, according to the present invention, the control state detector is comprised of a voltage comparator circuit which compares the output voltage from the motor driver circuit with a reference voltage and, in accordance with the counter electromotive force to be generated by rotation of the motor, outputs a signal for causing the neutral mechanism to interrupt the power train if the neutral control circuit is not in the predetermined control state. Consequently, it becomes possible to render the control state detector simple in construction and to make the neutral mechanism interrupt the power train.

What is claimed is:

1. A neutral control apparatus for use on an electric vehicle having a power train for transmitting rotating force to drive wheels, said neutral control apparatus comprising:

a battery;

an electric motor for producing the rotating force;

a neutral mechanism for selectively interrupting said rotating force of said powertrain;

a control state detector for detecting whether a motor control unit for controlling said motor is in a predetermined control state; and a neutral control mechanism controller for actuating an actuator according to a signal output from said control state detector to cause said neutral mechanism to interrupt said power train.

2. A neutral control apparatus according to claim 1, wherein said motor is driven by a motor driver circuit, and wherein said control state detector includes a voltage comparator circuit for comparing an input voltage from said motor driver circuit with a given reference voltage and producing a signal in accordance with the result of the comparison.

3. A neutral control apparatus according to claim 1, wherein said neutral mechanism includes a claw clutch which is operated by said actuator to engage or disengage said power train.

4. A neutral control apparatus according to claim 1, wherein there is further provided a function checker-controller for checking the state of operation of said neutral mechanism.

5. A neutrals control apparatus according to claim 4, wherein said neutral mechanism includes an operation detection circuit for detecting the operation of said actuator, which sends out an output signal to said function checker-controller when said neutral mechanism is in a predetermined operational state, and which does not send out an output signal to said function checker-controller when said neutral mechanism is not in the predetermined operational state.

6. A neutral control apparatus according to claim 4, wherein said function checker-controller is equipped with a charge control circuit for controlling charging of said battery, and wherein said charge control circuit produces a cutoff signal to disengage said neutral mechanism when said battery is started to be charged.

* * * * *